United States Patent [19]

Speicher et al.

[11] 4,431,205
[45] Feb. 14, 1984

[54] GOLF CART

[75] Inventors: John M. Speicher, Santa Ana; Allan A. Voigt, Anaheim, both of Calif.

[73] Assignee: An-Penn, Inc., Punta Gorda, Fla.

[21] Appl. No.: 347,991

[22] Filed: Feb. 11, 1982

[51] Int. Cl.³ .............................................. B62K 5/04
[52] U.S. Cl. ........................... 280/282; 224/42.03 B; 280/62; 280/281 LP; 280/289 A; 280/292; 280/DIG. 6
[58] Field of Search ................ 280/270, 281 LP, 282, 280/289 A, 292, 62, 92, 769, DIG. 5, DIG. 6; 180/211; 224/42.03 B; 414/462

[56] References Cited

U.S. PATENT DOCUMENTS

| | | | |
|---|---|---|---|
| 2,338,955 | 1/1944 | Metcalf | 280/769 |
| 2,749,997 | 6/1956 | Deslippe | 180/208 |
| 2,926,927 | 3/1960 | Enright | 280/87.02 R |
| 3,096,100 | 7/1963 | Clarke et al. | 280/282 |
| 3,605,929 | 9/1971 | Rolland | 180/208 |
| 3,664,683 | 5/1972 | Gobby | 280/202 |
| 3,923,219 | 12/1975 | Glover et al. | 224/42.03 A |
| 4,171,077 | 10/1979 | Richard, Jr. | 224/42.03 B |
| 4,189,274 | 2/1980 | Shaffer | 414/462 |
| 4,213,729 | 7/1980 | Cowles et al. | 414/462 |
| 4,283,070 | 8/1981 | Forrestall et al. | 280/220 |

FOREIGN PATENT DOCUMENTS

| | | | |
|---|---|---|---|
| 2465629 | 3/1981 | France | 280/62 |
| 700587 | 12/1953 | United Kingdom | 280/292 |
| 1364860 | 8/1974 | United Kingdom | 280/282 |

*Primary Examiner*—Joseph F. Peters, Jr.
*Assistant Examiner*—Kenneth R. Rice
*Attorney, Agent, or Firm*—Henry M. Bissell

[57] ABSTRACT

An improved golf cart is provided which comprises a frame bearing a seat having a high back, a pair of rear wheels flanking the seat and a front wheel, a set of foot cranks, a drive chain interconnecting the foot cranks and rear wheels, a steering assembly and a golf bag rack behind the back seat. To the upper part of the back rest are attached rearwardly extending rollers so that the cart can be tilted up to rest and ride on the rear wheels and rollers for compact storage and transport of the cart. An L-shaped support bracket may be secured to a car bumper for supporting and transporting the cart in the tilted up position. The cart may include an arm depending from the frame and engageable with the bracket and connectors to aid in holding the cart on the bracket. The cart can also include gears, a gear shift mechanism, brakes and a brake lever. The steering assembly can include a transverse bar pivoted to the frame below the front of the seat, and a forwardly extending link rod pivoted at one end to the bar and at the opposite end to one side of the fork holding the front wheel. The bar bears spaced handles, so that pivoting of the bar pivots the front wheel. The bar-frame pivot point and the link-bar pivot point are on opposite sides of the longitudinal axis of the frame. The cart is simple, durable, inexpensive, offers good exercise and is easy to move about, store and transport.

12 Claims, 10 Drawing Figures

GOLF CART

BACKGROUND OF THE INVENTION

1. Field of the Invention

The present invention generally relates to vehicles and more particularly to an improved type of golf cart.

2. Description of the Prior Art

Golf is a very popular sport participated in by millions of people, young and old alike. It is one of a very limited number of sports that can be played with success by the elderly and which offers them some useful exercise. The golf bag containing the regulation limit of 14 clubs, both woods and irons, unfortunately usually weighs a considerable amount, about 30 lbs. and is difficult to carry by a shoulder strap over the length of the 18 holes of a golf course which may approximate four or more miles. Moreover, the player's golfing skills may deteriorate during the game of play due to energy expended in carrying the golf bag and clubs.

For many years caddies were used to carry the player's clubs. However, more recently caddy carts have largely replaced caddies. Caddy carts are of two general types: those which bear the golf bag on a pair of wheels and frame and which are pulled along by the golfer, or in a limited few cases are powered by a battery, and those which resemble automobiles in which the golfers sit and which are powered by electric or gasoline motors. The latter type is particularly hard on the golf course, tending to dent and rut the fairway when used in the wet season, and offer the golfer little exercise other than that obtained by hitting the golf ball and steering the vehicle. On the other hand, the pull cart type generally does not greatly reduce the energy which would otherwise be expended, since the golfer must still walk the whole course and pull the cart (except when the cart is powered) and cannot sit down. Thus, such pull carts usually offer no place for the golfer to sit when rest is needed. Accordingly, it would be desirable to be able to provide a golf cart which would permit the golfer to sit comfortably while traversing the golf course, but which would also afford some exercise in substitution for that missed by not walking the course and pulling a cart. Such a golf cart preferably should be inexpensive, durable, efficient, and easy to store and transport in a minimum amount of space with little effort.

U.S. Pat. No. 2,926,927 of Enright relates to a coaster vehicle, not self-propelled, for transporting a golf bag and permitting the golfer to ride on downhill slopes. Rolland U.S. Pat. No. 3,605,929 relates to an electrically-powered, motor-driven golf cart of the tricycle type with special provision for pivoting the frame to traverse side slopes. Deslippe U.S. Pat. No. 2,749,997 discloses another variant of a motor-driven, tricycle golf cart which can be disassembled for storage or transport. The Gobby U.S. Pat. No. 3,664,683 discloses a conventional form of tricycle with a basket for carrying groceries, etc. Cowles et al U.S. Pat. No. 4,213,729 shows an arrangement for loading and transporting a wheelchair on the back of an automobile. Glover et al U.S. Pat. No. 3,923,219, Richard Jr. U.S. Pat. No. 4,171,077 and Shaffer U.S. Pat. No. 4,189,274 show various types of apparatus for supporting accessories, such as bicycles, motorcycles, and the like, on a vehicle for transport. The cart and transport arrangements of the present invention are considered to be unique and distinct from any and all of these prior art examples.

SUMMARY OF THE INVENTION

The present invention satisfies the foregoing needs. Thus, an improved golf cart is provided which is simple, inexpensive, durable and efficient. It is substantially as set forth in the accompanying Abstract. Thus, it includes a frame bearing a pair of rear wheels with a seat therebetween. The seat has a seat back and may be of the semi-reclining type. A front wheel is disposed on the front end of the frame. A drive train including a sprocket with foot cranks is secured to the frame and a drive chain runs to the rear wheels. Gears and a gear lever may be provided, along with one or more wheel brakes and a brake lever.

The cart is steered by a transverse bar with upraised handles. The bar is pivoted to one side of the frame below the front end of the seat and is pivotably connected off center to the rear end of a forwardly projecting link. The front end of the link is connected to one side of the fork of the front wheel. The fork is rotatably secured to the frame.

The cart is fitted with a golf bag bracket behind the seat and a pair of spaced rollers facing rearwardly and connected to the upper end of the seat back. Thus, the cart can be stored on its rear end so that the rear wheels and rollers engage the ground. A plurality of such carts in this position can be easily stored together in a minimum amount of space, as at a golf Pro Shop or golf Club House storeroom or the like. The cart in the same position can be easily carried in an L-shaped bracket attached to the bumper of an auto. For this purpose, the cart can have an arm engageable with a part of the bracket and a connector releasably engageable by a connector on the bracket.

BRIEF DESCRIPTION OF THE DRAWINGS

A better understanding of the present invention may be had from a consideration of the following detailed description, taken in conjunction with the accompanying drawings in which.

DESCRIPTION OF THE PREFERRED EMBODIMENTS

FIGS. 1–5

Figure 1:
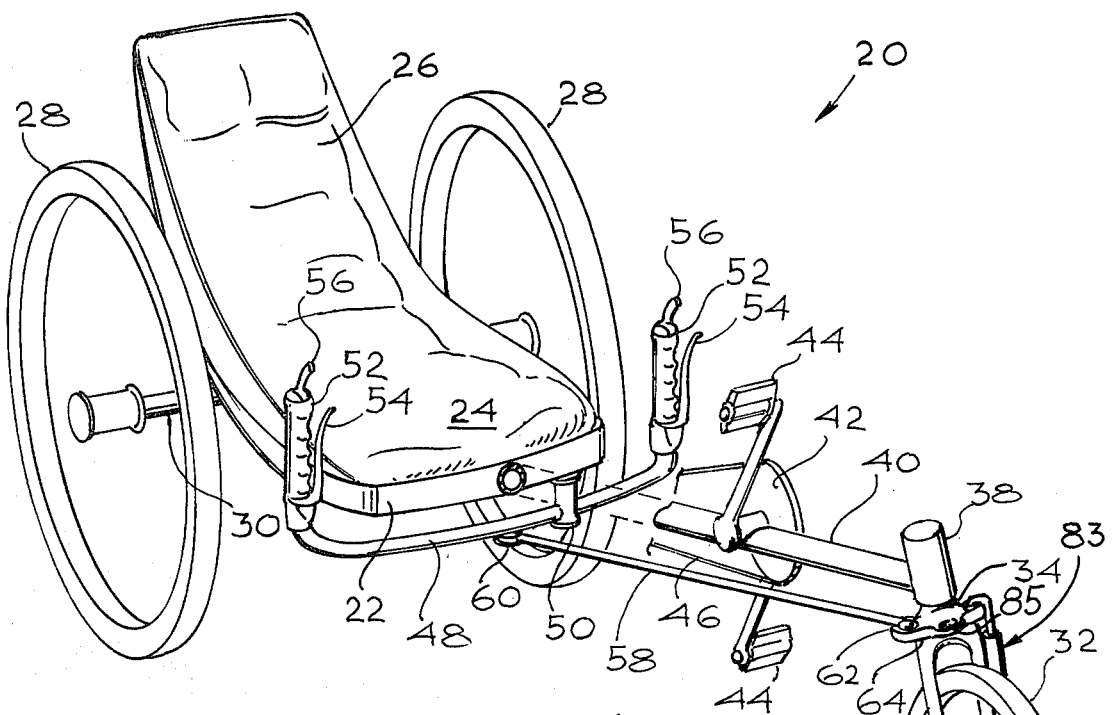
FIG. 1 is a schematic perspective view of a preferred embodiment of the improved golf cart of the present invention.
Figure 5:
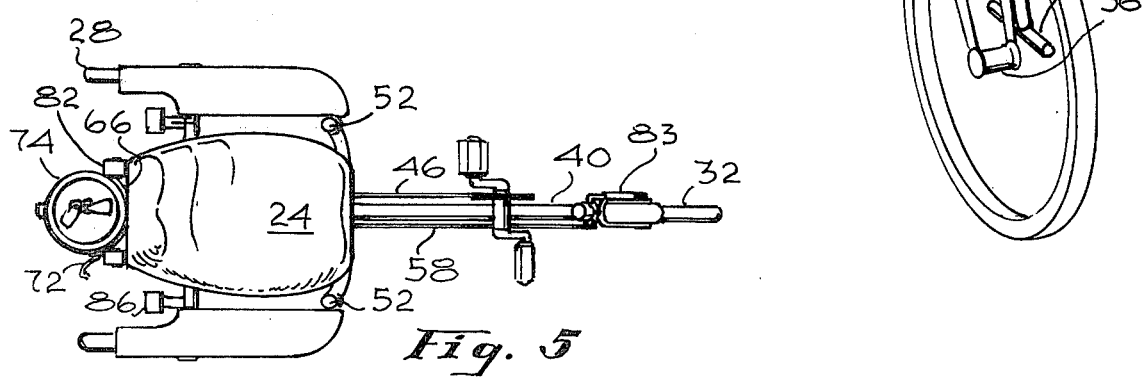
FIG. 5 is a schematic top plan view of the cart and golf bag of FIG. 2.

Now referring more particularly to FIGS. 1–5 of the accompanying drawings, a preferred embodiment of the improved golf cart of the present invention is schematically depicted therein. Thus, cart 20 is shown which comprises a frame 22 bearing an upholstered seat 24 having an upraised back 26. Seat 24 and back 26 may be, if desired, semi-reclining for maximum comfort. Frame 22 is supported in a level position by a pair of rear wheels 28 rotatably secured on opposite sides of seat 24 to a transverse axle 30 secured to frame 22, and by a front wheel 32. Front wheel 32 is secured to a vertical fork 34 by a horizontal axle 36 for rotation in fork 34. Fork 34 is rotatably secured to the front end 38 of frame 22, in turn connected to the remainder of frame 22 by an elongated tube 40.

Tube 40 bears a drive wheel or sprocket 42 bearing a pair of foot pedals 44 and a drive chain 46 extending rearwardly into driving connection (not shown) with rear wheels 28. A transverse bar 48 is disposed below and pivotably connected to frame 22 at pivot point 50 adjacent the front end of seat 24. Bar 48 bears a pair of spaced upraised steering handles 52 at its opposite ends. Handles 52 can include or have attached thereto brake levers 54 (connected to rear wheels 28 in a manner not shown) and gear shift levers 56 connected to a gear cluster containing multiple gears or sprockets (not shown) through which drive chain 46 passes.

The rear end of an elongated link rod 58 is pivotably secured at pivot point 60 to bar 48, and the front end of rod 58 is secured at pivot point 62 to an arm 64 extending from one side of fork 34. It will be noted that pivot point 50 is on one side of the longitudinal centerline or axis of cart 20 while pivot points 60 and 62 are on the opposite side of that axis. This is to facilitate clearance of rod 58 relative to sprocket 42, chain 46 and pedals 44. Rotation of bar 48 by handles 52 effects rotation of wheel 32 for easy, precise and proper steering of cart 20.

Figure 2:
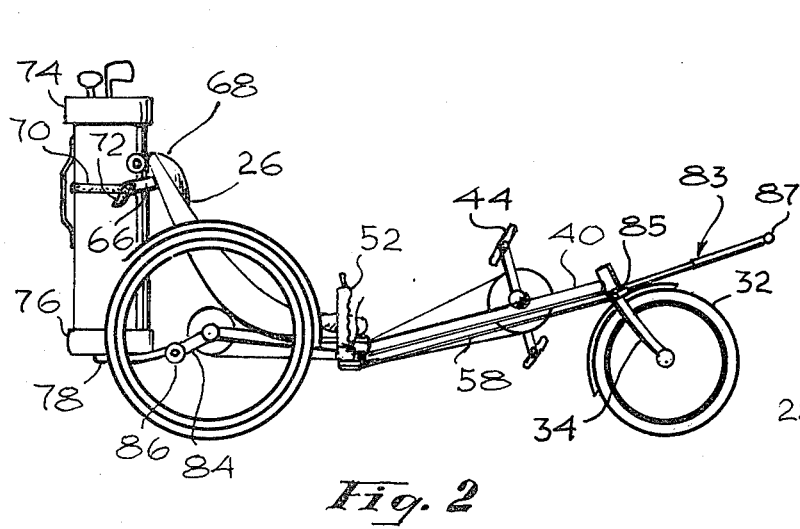
FIG. 2 is a schematic side elevation of the cart of FIG. 1, depicted bearing a golf bag with clubs.
Figure 3:
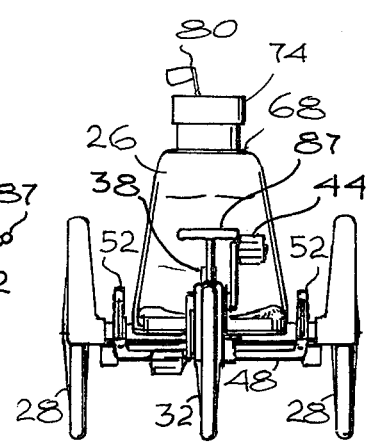
FIG. 3 is a schematic front elevation of the cart and golf bag of FIG. 2.
Figure 4:
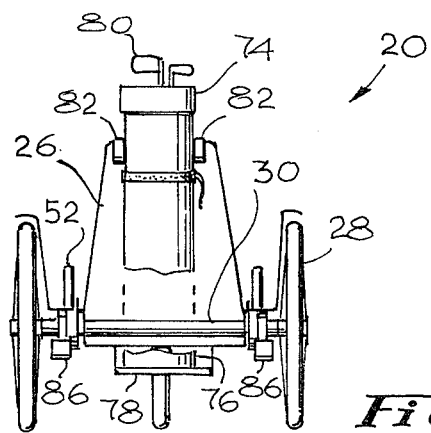
FIG. 4 is a schematic rear elevation, partly broken away, of the cart and golf bag of FIG. 2.
Figure 6:
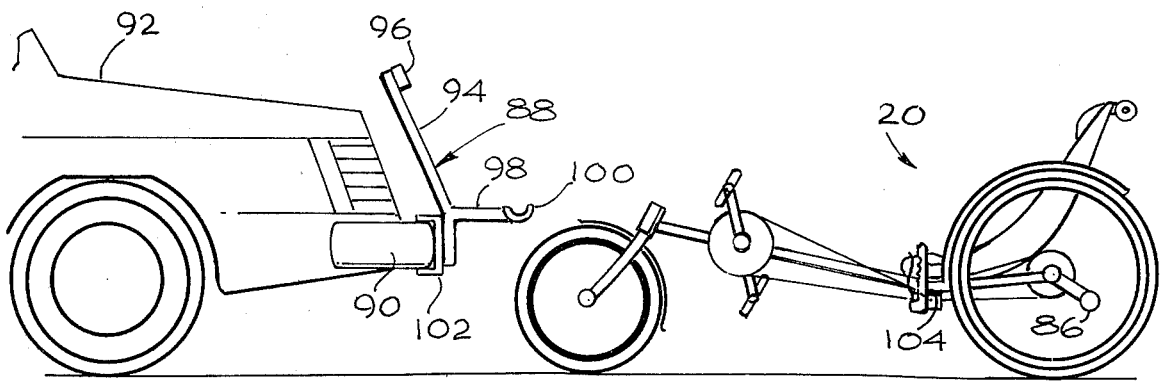
FIG. 6 is a schematic side elevation of the cart of FIG. 1 and a support bracket secured to the rear bumper of an automobile.

As can be seen particularly in FIGS. 2–5, cart 20 is provided with a semi-circular bracket 66 which projects rearwardly from the rear of back 26 at the upper end 68 thereof and which can be fitted with, if desired, a flexible strap 70 having a releasable cinch 72 in order to releasably secure a golf bag 74 in place on cart 20. The lower end 76 of bag 74 rests on a bracket 78 secured to and depending from frame 22 below and rearward of axle 30 (FIGS. 2 and 4). Thus, bag 74 is carried in an about upright position with clubs 80 readily accessible to the golfer user of cart 20.

Cart 20 bears equipment for facilitating storage and transport of cart 20. Thus, a pair of spaced rollers 82 are provided which project rearwardly from end 68 lateral of bracket 66. Cart 20 also has a pair of arms 84 secured to and extending rearwardly and downwardly from axle 30 medial of wheels 28. Arms 84 have enlarged free ends 86.

FIG. 2 also shows a detachable, pivoted towing bar 83 coupled to the steering fork 34 at pivot mount 85 which permits the bar 83 to be lifted to a generally horizontal position for pulling the golf cart or pivoted downward to a position for stowing along the side of the fork 34. The mount 85 also permits the towing bar 83 to be readily detached, should the user so desire, and to be re-attached for use, with equal ease. As indicated, the towing bar 83 is telescoping and has a tee handle 87 to facilitate pulling the vehicle by hand. As is known in the art, the telescoping and locking mechanism which permits the members comprising the towing bar 83 to telescope together comprises an internal, off-center cam mechanism which will accommodate some rotation of the tube members, relative to each other, but also serves to lock the telescoping members in a selected position by further rotation of one member with respect to the other. Thus, when the golf cart is to be pulled by hand, as in traversing hilly terrain which is too steep to ride over comfortably, the towing bar 83 is drawn up from its stowed position alongside the fork 34 and extended as shown in FIG. 2. When the user desires to ride the golf cart, the towing bar 83 is telescoped together and pivoted down to the stowed position. As an alternative arrangement, the towing bar 83 can, if desired, be attached in similar fashion to the center post (not shown) which pivots within the front end 38 of the frame.

FIGS. 6–9

The manner in which cart 20 can be stored and transported is shown in FIGS. 6–9. Thus, in those figures it is seen that a bracket 88 can be provided, which is generally L-shaped and is attachable to, for example, the rear bumper 90 of an auto 92. Bracket 88 has an upstanding limb 94 bearing at its upper end a connector 96, and a generally horizontal limb 98 having a transverse recess or fitting 100 on the free end thereof, which fitting is adapted to receive ends 86. Bracket 88 is releasably secured to bumper 90 by a channel shaped slip fitting 102. Cart 20 has a connector 104 on the underside of frame 22 which mates with connector 96.

Figure 7:
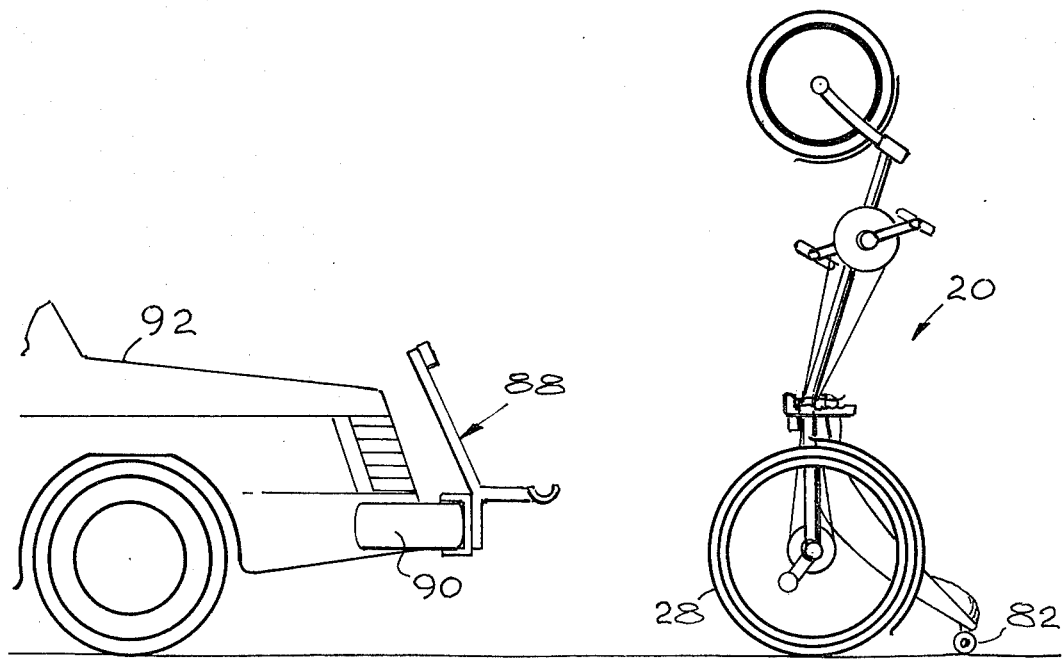
FIG. 7 is a schematic side elevation of the cart and bracket of FIG. 6, with the cart in a storage position resting on its rear wheels and rollers in preparation for loading.
Figure 8:
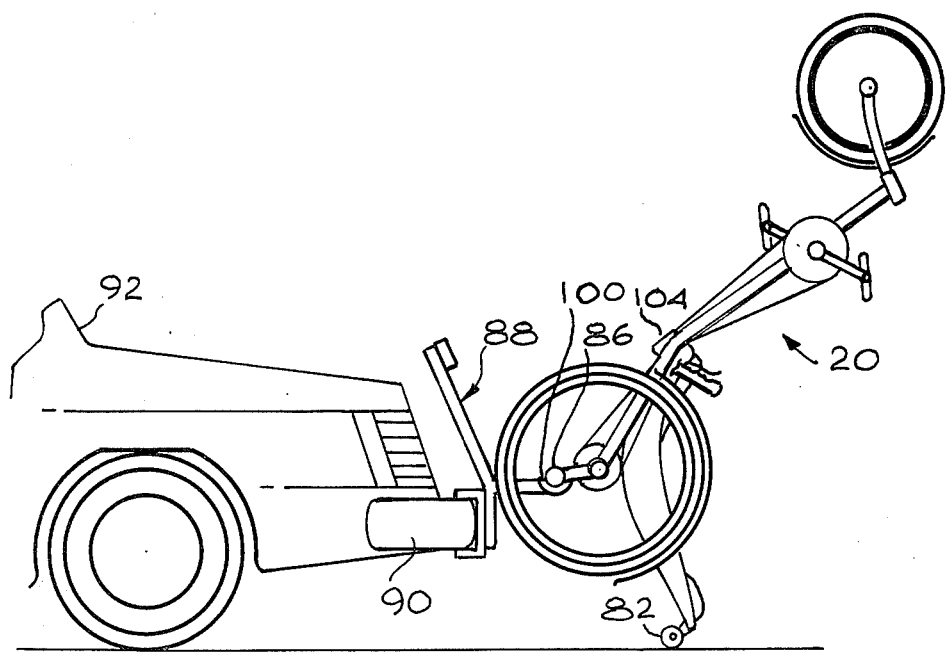
FIG. 8 is a schematic side elevation of the cart and bracket of FIG. 6 with the cart in a partially loaded position initially engaging the bracket.
Figure 9:
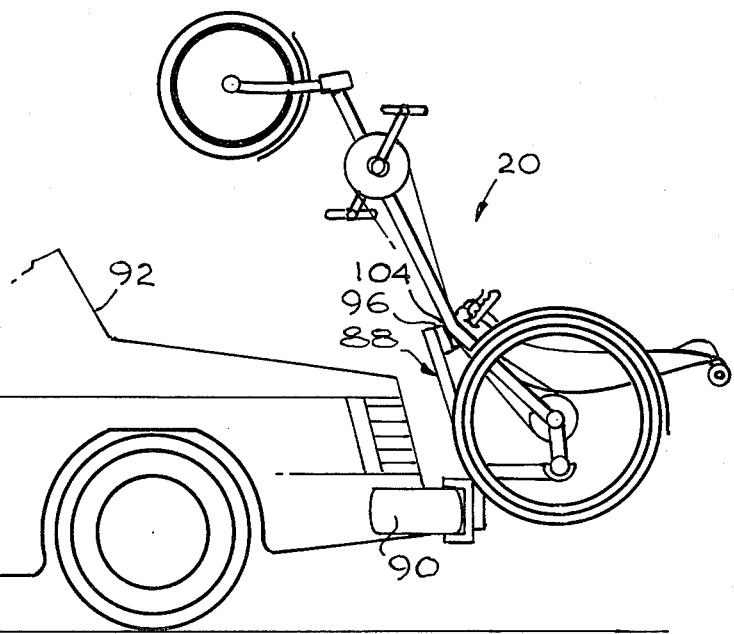
FIG. 9 is a schematic side elevation of the cart and bracket of FIG. 6, with the cart in the fully engaged transport position disposed and secured to the bracket.

When it is desired to store cart 20, it is tilted up so that it rests on rear wheels 28 and rollers 82 (FIG. 7). In this position it occupies a minimum amount of space and can be conveniently stacked with a number of other of such carts in a store room, shed, etc. In this position, it also can be wheeled into contact with bracket 88 (FIG. 8) so that ends 86 engage fitting 100. Thereafter golf cart 20 can be tilted forward to fully engage bracket 88 (FIG. 9) so that connectors 96 and 104 releasably engage each other. In this position (FIG. 9) cart 20 can be easily transported by auto 92 without risk and can then be removed therefrom by reversing the loading procedure. It will be noted that the described handling of cart 20 can be carried out by young and old alike with a minimum of effort and without lifting the main bulk of cart 20. Therefore, cart 20 is very convenient to store and transport. It is also very convenient while providing desired pedaling exercise from a seated, preferably semi-reclining position. Cart 20 can be fabricated of conventional materials, such as tubular aluminum, steel or the like for frame 22, etc. The wheels, brakes and drive components can be readily adapted from conventional bicycle parts.

FIG. 10

Figure 10:
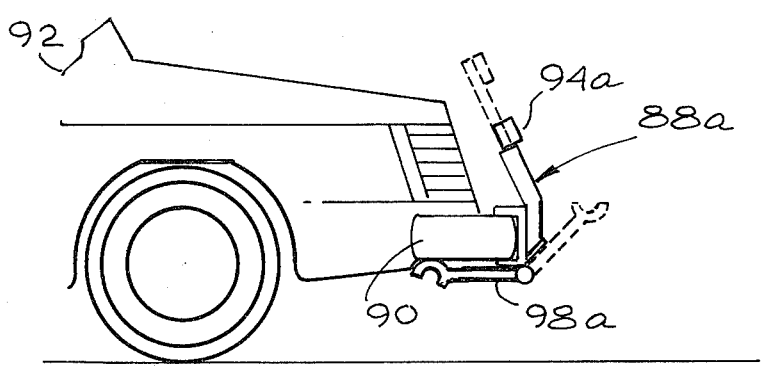
FIG. 10 is a schematic side elevation of a modified version of the cart support bracket secured to the rear bumper of an automobile.

A modified version of the loading bracket utilized in the present invention is schematically depicted in side elevation in FIG. 10. Thus, bracket 88a is shown which is generally similar to bracket 88 and operates similarly to bracket 88. Components thereof similar to those of bracket 88 bear the same numerals but are succeeded by the letter "a". Bracket 88*a* includes an upper limb 94*a* which can be telescoped between the stored position illustrated and the operative position shown in dotted outline. Moreover, lower limb 98*a* can be pivoted between a stored position under bumper 90 (shown in FIG. 10) and an operative position shown in dotted outline, and can be locked into either position. Bracket 88*a* has the advantages and uses of bracket 88.

Although there have been described above specific arrangements of an improved golf cart in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. An improved golf cart, comprising, in combination:
   a frame;
   a seat having a back disposed on said frame;
   a pair of rotatable rear wheels disposed on opposite sides of said seat, mounted to said frame;
   a third rotatable wheel connected to said frame in front of said pair of wheels;
   a set of foot cranks and drive sprocket connected to said frame;
   drive means including a chain interconnecting said foot cranks and drive sprocket with a driven sprocket coupled to at least one wheel for driving said cart;
   steering means connected to said frame and said front wheel;
   golf bag support means secured to at least one of said frame and seat; and
   support means including rotatable means connected to said cart for movement and storage of said cart with the frame of said cart in a generally vertical attitude.

2. The improved golf cart of claim 1 wherein said rotatable means includes one or more rollers connected to at least one of said frame and the upper rear end of said seat back and co-acting with the rear wheels for movement and storage of the cart in a generally vertical attitude.

3. The improved golf cart of claim 2 wherein said support means includes at least one arm secured to and depending from said frame below said seat and a generally L-shaped bracket securable to the bumper of an automobile and including a generally horizontal portion having a transverse recess which is adapted to releasably receive said arm for pivotable support thereon and a generally vertical portion adapted to releasably support said frame in a generally vertical attitude for transport of said cart on said automobile.

4. The improved golf cart of claim 3 wherein said generally vertical portion of said bracket bears a first connector releasably engageable with a second connector on said frame to hold said cart in place on said bracket.

5. The improved golf cart of claim 4 wherein said seat back bears said rollers which extend rearwardly to support the cart together with the rear wheels for movement and storge when the cart is oriented with the frame in a generally vertical attitude, and wherein said golf bag support means are connected to said seat back and to said frame below said seat.

6. The improved golf cart of claim 1 wherein said drive means includes interconnected gear means and gear control means.

7. The improved golf cart of claim 5 wherein said steering means includes a fork mounted to said front wheel and rotatably connected to said frame, an elongated stiff link, a transverse bar pivotably mounted to said frame adjacent the forward edge of said seat and bearing upraised steering handles at opposite ends thereof, said link being pivotably coupled at its rear end to said transverse bar and at its front end to one side of said fork, whereby pivoting of said bar effects pivoting of said front wheel for steering control.

8. The improved golf cart of claim 7 wherein said chain is interconnected to said rear wheels and said foot cranks, wherein said link is pivotably connected to said transverse bar and fork on one side of the longitudinal axis of said cart and said bar is pivotably connected to said frame on the opposite side of said longitudinal axis, whereby clearance of said cranks and chain by said link is effected.

9. The improved golf cart of claim 8 wherein said cart includes gear means connected to said drive means and brake means connected to at least one of said wheels and wherein said handles bear gear shift levers and brake levers.

10. The improved golf cart of claim 9 wherein said generally horizontal portion of said L-shaped bracket is pivotable between an inverted storage position and an operative position and wherein said generally vertical portion of said bracket is telescopable.

11. The improved golf cart of claim 7 further including a towing bar coupled to the fork and being pivotable between a raised position to permit a user to pull and steer the cart and a stowed position alongside the fork.

12. The improved golf cart of claim 11 wherein the towing bar comprises a pair of telescoping members, the outer member having a handle affixed to the distal end thereof.

* * * * *